United States Patent [19]

Svoboda et al.

[11] 3,864,372

[45] Feb. 4, 1975

[54] PROCESS FOR THE PRODUCTION OF UNSATURATED ORGANOSILICON COMPOUNDS

[75] Inventors: Petr Svoboda; Vera Vaisarova; Martin Capka; Jiri Hetflejs; Milos Kraus; Vladimir Bazant, all of Prague, Czechoslovakia

[73] Assignee: Ceskoslovenska Akademie ved, Praha, Czechoslovakia

[22] Filed: Dec. 1, 1972

[21] Appl. No.: 311,270

[30] Foreign Application Priority Data

Dec. 10, 1971   Czechoslovakia.................. 8623-71
Dec. 16, 1971   Czechoslovakia.................. 8758-71
Mar. 2, 1972    Czechoslovakia.................. 1362-72
Mar. 29, 1972   Czechoslovakia.................. 2102-72

[52] U.S. Cl. ..... 260/448.2 E, 252/431, 260/448.8 R
[51] Int. Cl. ............................................. C07f 7/08
[58] Field of Search .............. 260/448.2 E, 448.8 R; 252/431

[56] References Cited
UNITED STATES PATENTS 3,159,662   12/1964   Ashby ......................... 260/448.2 E

*Primary Examiner*—Paul F. Shaver

[57] ABSTRACT

Process for the production of unsaturated organosilicon compounds by the reaction of chloro- and alkoxy-substituted silicon hydrides containing one Si-II bond with conjugated dienic hydrocarbons and derivatives thereof, containing at least two C=C bonds. The reactants are contacted in the presence of Pd(11) compounds, such as $PdCl_2$, $PdBr_2$, Pd(acetylacetonate)$_2$, compleces of general formula $L^1L^2PdX_2$, $L^3PdX_2$, and $(L^4PdY)_2$ 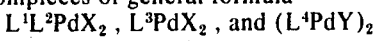

where $L^1$ and $L^2$ is a tertiary phosphine, preferably triphenylphosphine, or a nitrile, preferably benzonitrile, $L^3$ is a ditertiary phosphine, preferably 1,2-bis(triphenylphosphine)ethane, or a dinitrile, preferably O-xylylenedinitrile, $L^4$ is a coordinated alkene or an alkenic fragment, preferably pi-allyl group, X is chlorine or bromine atom, and Y is chlorine atom or acetoxy group.

The substances formed by contacting the above defined Pd(11) compounds with organic polymers contain tert.amine, tert. phosphine, or nitrile groups, or these groups in a suitable combination, the preferred polymers being polystyrene, copolymers of styrene with divinylbenzene or with allyl chloride, poly(vinyl chloride), polymethacrylates and their copolymers.

7 Claims, No Drawings

PROCESS FOR THE PRODUCTION OF UNSATURATED ORGANOSILICON COMPOUNDS

The present invention relates to a process for the production of unsaturated organosilicon compounds by hydrosilylation of conjugated dienic hydrocarbons and their derivatives.

It is known in the art that the reaction of organosilicon compounds containing one Si—H bond with alkenic hydrocarbons containing two conjugated C=C bonds leads to several types of products: monosilyl-substituted alkenes (1:1 adducts), formed by the addition of one molecule of an organosilicon hydride to one molecule of a diene, further disilyl-substituted alkanes (2:1 adducts), which are the products of the addition of two molecules of the silicon hydride to one molecule of the hydrocarbon, and last, but not least, monosilyl-substituted alkadienes (X 1:2 adducts), which are the products of the reaction of one molecule of the silicon hydride with two molecules of the diene.

Processes so far known in the art enable to prepare compounds of the first type, i.e., the 1:1 adducts, only with difficulty or in comparatively low yields, especially when chloro- or alkoxy-substituted silicon hydrides are used as reactants. So, for instance, n-butenyltrichlorosilane was obtained by reacting trichlorosilane with butadiene in the presence of diacetyl peroxide as the initiator at 300°C for 24 hours (J. Am. Chem. Soc. 69,2916 (1947), U.S. Pat. No. 2,626,271). The additions catalysed with platinum-on-supports catalysts or with soluble platinum compounds yield as a rule a mixture of 1:1 and 2:1 adducts, with low content of the 1:1 adducts. In some cases also other side products are formed. As an example, the reaction of trichlorosilane with butadiene catalysed with 0.77 percent Pt/C and carried out at 160°C over a period of 2,5 hours gave the 1:1 adduct in 40 percent yield and the 2:1 adduct in 30 percent yield (U.S. Pat. No. 2,637,738). Hydrosilylation of butadiene with methyldichlorosilane catalysed with the 1% Pt/C catalyst at 160°C gave after 10 hours only 14 percent yield of the corresponding 1:1 adduct. The reaction was accompanied by an extensive formation of side products, the major one being the adduct of methyldichlorosilane and vinylcyclohexene. The latter compound was formed during the reaction by cyclodimerization of butadiene (Izv. Akad. Nauk SSSR, otd. khim. nauk 1957, 1206). The low selectivity is exhibited also by one of the most widely used hydrosilylation catalysts, chloroplatinic acid. The addition of methyldichlorosilane to piperylene, carried out at 100°–120°C for 5 hours, yielded the 1:1 adduct in 43 percent yield (Izv. Akad. Nauk. SSSR, itd, khim. nauk 1960, 1419). On addition of triethoxysilane to isoprene, the 1:1 adduct was formed in 17 percent yield, and similar reaction of trichlorosilane with chloroprene afforded the corresponding 1:1 adduct in only 7 percent yield (Azerb. Khim. Zhur. 1962 (2), 9; Chem. Abstr. 59,5189 (1963)).

The few selective catalytic systems so far available, which were found to direct the addition of trichlorosilane to 1,3-butadiene to the nearly exclusive formation of the 1:1 adduct, are metallic palladium in the presence of an excess of a tertiary phosphine (J. Chem. Soc. (D), 1971, 247) and a zero-valent palladium complex, bis(triphenylphosphine) (malei anhydride) palladium (Organometal. Chem. Synth. 1,193 (1971) ).

These catalysts, although highly selective, suffer from some disadvantages. In the first case, a high molar excess of a tertiary phosphine, relative to the metal, is unavoidable (e.g., 10:1), in the other one the catalyst is prepared by multi-step process, the last being the reaction of the in the air extremely unstable tetrakis (triphenylphosphine) palladium with maleic anhydride (J. Chem. Soc. Japan, Pure Chem. Sect. 83,454 (1968) ).

The object of the present invention is to provide a process for the production of unsaturated organosilicon compounds which makes it possible to carry out the addition reaction of silicon hydrides to conjugated dienic hydrocarbons and their derivatives under mild conditions with good yields of the 1:1 adducts. According to the invention the reaction of silicon hydrides of general formulae $$R_nSiNCl_{3-n}$$

where R is methyl or ethyl group and $n$ equals to zero or to one, and $$(RO)_3SiH)$$

where R is methyl, ethyl or propyl group with dienic hydrocarbons, preferably butadiene, isoprene, piperylene, chloroprene, and 2,3-dimethyl-1,3-butadiene, is carried out in the presence of Pd(11) compounds as catalysts. The suitable catalysts of this type are $PdCl_2$, $PdBr_2$, Pd(acetylacetonate)$_2$, complexes of general formulae $$L^1L^2PdX_2, L^3PdX_2, \text{ and } (L^4PdY)_2$$

where $L^1$ and $L^2$ is a tertiary phosphine, preferably triphenylphosphine, or a nitrile, preferably benzonitrile, $L^3$ is a ditertiary phosphine, preferably 1,2-bis(-triphenyl-phosphine) ethane, or an organic dinitrile, preferably o-xylylene-dinitrile, $L^4$ is a coordinated alkene or alenic fragment, preferably pi-allyl group, X is chlorine or bromine atom, and Y is chlorine atom or acetoxy group, and also the compounds formed by contacting substances of the above defined types with organic polymers containing tert. amine, tert. phosphine or nitrile groups, or these groups in a suitable combination, the preferred polymers being polystyrene, copolymers of styrene with divinylbenzene or with allyl chloride, poly(vinyl chloride), polymethacrylates and their copolymers.

The reaction can be effected both in the absence and in the presence of a solvent, under the pressure of the vapours of reaction components at the reaction temperature or under an elevated pressure, adjusted by an inert gas, preferably nitrogen or argon. The catalysts which contain the transition metal bonded to the organic groups of polymeric compounds make it possible to perform the reaction also in the gas phase. As a solvent, any substance which does not react with the reactants, dissolves the catalyst and the reacting compounds can be used. Such solvents are, for instance, ethers, such as tetrahydrofurane, or aromatic hydrocarbons such as benzene, toluene, a xylene, etc. The choice of the reaction temperature is influenced above all by the reactivity of the starting compounds. With chloro-substituted silicon hydrides, the reaction with butadiene or with isoprene can be carried out already at temperatures from −15° to +20°C. With majority of the above described catalysts it is however, advantageous to work at temperatures 20° – 130°C.

Although relative amounts of a silicon hydride and a dienic hydrocarbons are determined by stoichiometry of the reaction (the hydride to the diene molar ratio 1:1), the reaction can be carried out also with non-stoichiometric ratios of the reaction components. So, for example, with chloro-substituted hydrides, the excess of the dienic hydrocarbon somewhat increases the conversion of 1:1 adduct and enables obtain the desired yields in a shorter time. The amount of catalysts can vary within wide limits. The palladium catalysts described in this invention are effective already in the amounts of about 1 mol palladium per $1 \times 10^4$ mol of a dienic hydrocarbon; the maximum of the catalyst is dictated by the economics of the process. The inventors found that desirable rates of the reaction can be obtained by the use of the catalyst in concentrations of the order of 1 gatom metal per 100 to 10,000 moles of a dienic hydrocarbon. The reaction course is not further seriously affected by the metallic palladium formed during the reaction. In most cases, the reaction course does not depend also on the order in which individual components are added to the reaction mixture. With alkenic palladium complexes it is however advantageous to use them, or the silicon hydride, as the last component in the preparation of the reaction mixture.

The alkenylsilanes prepared according to this invention contain reactive groups and can be thus employed as starting compounds in preparing other organosilicon derivatives. They can be further used for hydrofobisation of organic materials or as coupling agents for cross-linking of inorganic materials with organic polymers.

The following examples are illustrative of the practise of the invention and are not intended for purposes of limitation. Unless otherwise stated, all parts are by weight.

EXAMPLE 1

Into a cooled pressure vessel were introduced 1 part of bis(benzonitrile) palladiumdichloride, 67 parts of trichlorosilane, and 32.5 parts of liquid 1,3-butadiene. The reaction vessel was closed and then heated at 80°C over a period of 2 hours. Distillation afforded the 1:1 adduct, cis-2-butenyltrichlorosilane, in 87 percent yield.

EXAMPLE 2

Example 1 was repeated with the exception that the reaction components were added in the order: the catalyst, the butadiene, and the chlorosilane. Distillation afforded the 1:1 adduct in 91.5 percent yield.

EXAMPLE 3

A mixture of 1 part of bis(pi-allyl)dipalladiumdichloride, 67 parts of trichlorosilane, 32.5 parts of liquid 1,3-butadiene, and 200 parts of benzene was heated in an autoclave to 80°C over a period of 2 hours. The yield of the corresponding 1:1 adduct was 83.5 percent.

EXAMPLE 4

A mixture of 142g of 1,3-butadiene, 5 g of toluene, 134 g of trichlorosilane, and 42 mg of bis(benzonitrile)palladiumdichloride, cooled to −15°C, was allowed to warm up to the temperature 0°C, while stirring. Then 42 g of trichlorosilane was added and after the exothermic reaction subsided (during which the temperature of the reaction mixture rose to 10°C) an additional (201 g) trichlorosilane was portion-wise added while externally cooling the reaction mixture such that the temperature of the reaction mixture did not exceed 20°C. Distillation gave 82 percent 2-butenyltrichlorosilane (the cis to trans ratio 9:1).

EXAMPLE 5

Example 4 was repeated, except that bis(pi-allyl)dipalladiumdichloride (40 mg) was used in place of bis(benzonitrile)palladiumdichloride. The yield of the 1:1 adduct was 76 percent.

EXAMPLE 6

A mixture of 76 g of liquid 1,3-butadiene, 68 g of methyldichlorosilane, and 28 mg of bis(benzonitrile)palladiumdichloride was reacted as described in Example 4, yielding 62 percent 2-butanylmethyldichlorosilane.

EXAMPLE 7

A glass ampoule was charged with 1 part of a catalyst, and appropriate amounts of a silicon hydride and a dienic hydrocarbon were added. After sealing, the contents were allowed to stand at ambient temperature or heated to the desired temperature for a desired time. Conversions of starting chloro-substituted silanes to 1:1 adducts, determined by g.l.c., are given in Table I.

TABLE I (EXAMPLE 7)

| Diene (w. parts) | Silicon hydride (w.parts) | Catalyst | Reaction temp., °C | Reaction time, h | Conversion to 1:1 adducts, in % |
|---|---|---|---|---|---|
| 1,3-butadiene(32.5) | trichlorosilane(67) | /(pi-allyl)PdCl/$_2$ | 80 | 2 | 91 |
| 1,3-butadiene(32.5) | trichlorosilane(67) | (C$_6$H$_5$CN)$_2$PdCl$_2$ | 100 | 2 | 92 |
| 1,3-butadiene(37) | trichlorosilane(62) | /(C$_6$H$_5$)$_3$P/$_2$PdBr$_2$ | 80 | 2 | 75 |
| 1,3-butadiene(32.5) | trichlorosilane(67) | /o-C$_6$H$_{4(CN)2}$/$_2$PdCl$_2$ | 80 | 2 | 92 |
| 1,3-butadiene(32.5) | methyldichlorosilane(63) | /(pi-allyl)PdCl/$_2$ | 80 | 2 | 67 |
| 1,3-butadiene(37) | trichlorosilane(67) | /(pi-allyl)PdCl/$_2$ | 23 | 30 | 67 |
| 1,3-butadiene(35) | ethyldichlorosilane(65) | /(pi-allyl)PdCl/$_2$ | 80 | 5 | 36 |
| 1,3-butadiene(32.5) | trichlorosilane(67) | PdCl$_2$ | 120 | 3 | 78 |
| isoprene(42) | trichlorosilane(72) | (C$_6$H$_5$CN)$_2$PdCl$_2$ | 80 | 2 | 87 |
| isoprene(39) | methyldichlorosilane(65) | /(pi-allyl)PdCl/$_2$ | 80 | 2 | 64 |
| 2,3-dimethyl-1,3-butadiene(35) | methyldichlorosilane(62) | (C$_6$H$_5$CN)$_2$PdCl$_2$ | 80 | 2 | 27 |
| piperylene(36) | trichlorosilane(69) | /(pi-allyl)PdCl/$_2$ | 90 | 4 | 72 |
| chloroprene(41) | methyldichlorosilane(70) | /(C$_6$H$_5$)$_3$P/$_2$PdCl$_2$ | 90 | 7 | 37 |

EXAMPLE 8

A mixture of 20 parts of a macroreticular styrene-divinylbenzene copolymer containing 5.1 percent P in the form of the —CH$_2$P(C$_6$H$_5$)$_2$ groups, 5 parts of palladium(II) chloride, and 130 parts of ethanol was heated to 110° C for 6 hours. After separation of the polymer, followed by its washing with three 100-ml. portions of ethanol and its drying, the catalyst contained 10.9% Pd.

EXAMPLE 9

A macroreticular styrene-divinylbenzene copolymer containing on its surface —CH$_2$CN groups was allowed to stand with 8 percent aqueous palladium chloride solution for 20 hours. Five parts of the solution per 1 part of the polymer were used. After filtration and drying, the catalyst contained 3.0% Pd.

EXAMPLE 10

A macroreticular copolymer of styrene with divinylbenzene containing surface —CH$_2$N(CH$_3$)$_2$ groups was saturated in the column by washing with 1 percent aqueous palladium(II) chloride solution. Forty parts of the solution per 1 part of the polymer were used. After drying, the catalyst contained 14,2% Pd.

EXAMPLE 11

A macroreticular copolymer of 2-dimethylaminoethyl methacrylate with ethylene-dimethacrylate was washed in the column with 1 percent aqueous solution of palladium(II) chloride. The solution was used in the weight ratio 40:1 with respect to the polymer. After drying, the catalyst contained 18.4% Pd.

EXAMPLE 12

A macroreticular copolymer of 2-cyanoethyl methacrylate with ethylene-dimethacrylate was washed in the column with 5 percent aqueous palladium(II) chloride solution. The weight ratio of the solution to the polymer was 10:1. After drying, the catalyst contained 0.5% Pd.

EXAMPLE 13

A mixture of 12 parts of a copolymer of allylchloride with divinylbenzene, containing surface —CH$_2$P(C$_6$H$_5$)$_2$ groups, 4.5 parts of bis(triphenylphosphine)palladiumdichloride, 35 parts of chloroform, and 15 parts of ethanol was heated at 60°C for a period of 6 hours. After separation, washing with 30 parts of chloroform and 15 parts of ethanol, and drying, the catalyst contained 1.82% Pd.

EXAMPLE 14

A mixture of 21 parts of the styrene-divinylbenzene copolymer from Example 8, 5 parts of bis(benzonitrile)palladiumchloride, 35 parts of benzene, and 15 parts of ethanol was heated to 65°C for 10 hours. After washing and drying, the catalyst contained 5.90% Pd.

EXAMPLE 15

One part of a catalyst, and appropriate amounts of a silicon hydride and a diene were reacted in a sealed glass ampoule under conditions specified in Table II. The conversion of starting chlorosilanes to the 1:1 adducts, determined by g.l.c., are also summarized in the Table.

TABLE II (EXAMPLE 15)

| Diene (w. parts) | Silicon hydride (w. parts) | Catalyst from Example | Reaction temp.,°C | Reaction time, h | Conversion to 1:1 adducts |
|---|---|---|---|---|---|
| 1,3-butadiene(72) | trichlorosilane(78) | 8 | 90 | 3 | 73 |
| 1,3-butadiene(52) | trichlorosilane(48) | 9 | 23 | 24 | 85 |
| 1,3-butadiene(52) | trichlorosilane(72) | 10 | 100 | 2 | 76 |
| 1,3-butadiene(62) | trichlorosilane(67) | 12 | 80 | 2 | 56 |
| 1,3-butadiene(47) | ethyldichlorosilane(51) | 14 | 80 | 2 | 88 |
| isoprene(52) | trichlorosilane(47) | 11 | 80 | 2 | 47 |
| isoprene(52) | trichlorosilane(61) | 13 | 110 | 3 | 86 |
| isoprene(52) | methyldichlorosilane(61) | 8 | 80 | 2 | 91 |
| isoprene(56) | ethyldichlorosilane(49) | 8 | 80 | 2 | 87 |
| 2,3-dimethyl-1,3--butadiene(55) | trichlorosilane(52) | 9 | 90 | 3 | 43 |
| pieprylene(52) | trichlorosilane(55) | 13 | 80 | 3 | 83 |
| chloroprene(61) | ethyldichlorosilane(67) | 8 | 80 | 5 | 32 |

EXAMPLE 16

A mixture of 1 part of the catalyst from Example 8, 52 parts of isoprene, and 47 parts of trichlorosilane was heated at 80°C over a period of 2 hours. After separation of the catalyst by filtration, 87 percent 1:1 adduct was obtained by distillation. The reaction was repeated under the same conditions in the presence of the catalyst recovered from the previous reaction. The 1:1 adduct was obtained in 82 percent yield.

EXAMPLE 17

A mixture of 1,3-butadiene and trichlorosilane vapours was passed over 6 parts of the catalyst from Example 9 at 100°C in the flow rate 0.14 mol per h C$_4$H$_6$ and 0.06 mol per h HSiCl$_3$. Chromatographic analysis showed 80 percent conversion of the silicon hydride in n-butenyltrichlorosilane.

EXAMPLE 18

A mixture of 1 part of the catalyst from Example 10, 70 parts of triethoxysilane, and 40 parts of liquid 1,3-butadiene was heated under the vapour pressure of the reactants to 85°C for 2 hours. n-Butanyltriethoxysilane was obtained in 52 percent yield.

EXAMPLE 19

A cooled reaction vessel was charged with 1 part of bis-(pi-allyl)-dipalladiumdichloride, 65 parts of triethoxysilane, and 35 parts of liquid 1,3-butadiene. After sealing, the reaction mixture was maintained at 80°C for 2 hours. After this period of time the butadiene reacted from 68 percent to give a mixture of the 1:1 adduct, n-butenyltriethoxysilane, and the 1:2 adduct, ana octadienyltri-ethoxysilane, in the ratio 2:1.

TABLE

| Temperature, °C/time, h | yield in percent of | |
|---|---|---|
| | 1:1 adduct | 1:2 adduct |
| 20/12 | 10 | 32 |
| 50/5 | 28 | 52 |
| 80/3 | 45 | 19 |
| 100/3 | 21 | 56 |
| 130/3 | 29 | 51 |

What we claim is:

1. A process for the production of unsaturated organosilicon compounds which comprises contacting a silicon compound containing one hydrogen atom attached to silicon per molecule, with a dienic hydrocarbon containing conjugated C=C double bonds and having from four to eight carbon atoms per molecule in the presence of a palladium complex selected from the group consisting of $L_2PdX_2$, $L_2^1PdX_2$, $L^3PdXCl_2$, and $(\pi-C_3H_5)PdCl/_2$ where L is a member selected from the group consisting of tertiary phosphines having at least one phenyl group attached to phosphorus per molecule, X is a member selected from the group consisting of halogens, $L^1$ is benzonitrile, $L^3$ is 1,2-bis(triphenylphosphine) ethane or 1,2-bis(cyanomethyl)benzene, and where $\pi-C_3H_5$ is a pi-allyl group.

2. A process for the production of unsaturated organosilicon compounds according to claim 1, wherein the palladium complex has the formula:

$$L_2PdX_2.$$

3. A process for the production of unsaturated organosilicon compounds according to claim 1, wherein the palladium complex has the formula:

$$L_2^1PdX_2.$$

4. A process for the production of unsaturated organosilicon compounds according to claim 1, wherein the palladium complex has the formula:

$$L^3PdXCl_2.$$

5. A process for the production of unsaturated organosilicon compounds according to claim 1, wherein the palladium complex has the formula:

$$(\pi-C_3H_5)PdCl/_2.$$

6. A process for the production of unsaturated organosilicon compounds according to claim 1, wherein the organosilicon compound has the formula:

$$R_nSiHCl_{3-n}$$

where R is methyl or ethyl radical and n is equal to zero or to one and is contacted with a conjugated diene selected from the class consisting of 1,3-butadiene, isoprene, piperylene, chloroprene, and 2,3-dimethyl-1,3-butadiene.

7. A process for the production of unsaturated organosilicon compounds according to claim 1, wherein the organosilicon compound has the formula:

$$(RO)_3SiH$$

where R is a member selected from the class consisting of methyl, ethyl, and propyl radicals and with 1,3-butadiene.

* * * * *